United States Patent

Kolatorowicz

[15] 3,678,358
[45] July 18, 1972

[54] BRUSHLESS DC ADJUSTABLE SPEED DRIVE WITH STATIC REGENERATIVE DC MOTOR CONTROL

[72] Inventor: Edwin E. Kolatorowicz, Erie, Pa.
[73] Assignee: General Electric Company
[22] Filed: July 14, 1970
[21] Appl. No.: 54,703

[52] U.S. Cl. .............................318/254, 318/439, 318/138
[51] Int. Cl. .................................................H02k 29/00
[58] Field of Search................318/138, 254, 439, 696, 685

[56] References Cited

UNITED STATES PATENTS

| | | | |
|---|---|---|---|
| 3,418,550 | 12/1968 | Kolatorowicz et al. | 318/128 |
| 2,193,914 | 3/1940 | Alexanderson | 318/138 |
| 1,937,377 | 11/1933 | Alexanderson | 318/138 |
| 1,976,463 | 10/1934 | Sabbah | 318/138 |
| 2,193,932 | 3/1940 | Mittag | 318/138 |

Primary Examiner—G. R. Simmons
Attorney—James C. Davis, Jr., Edward W. Goebel, Jr., Frank L. Neuhauser, Oscar B. Waddell and Joseph B. Forman

[57] ABSTRACT

For a brushless direct current motor there is provided a static adjustable speed control circuit including an SCR converter for controlling the average voltage applied to the motor windings by phase control of current flowing directly from a multi-phase power source and for commutating the current through the motor winding to maintain the proper current flow direction and torque. The SCR converter is controlled as a function of rotor position, a-c line input conditions, phase advance and SCR converter voltage output. A voltage feedback signal from the converter output is compared to a reference voltage to derive a comparison signal used to adjust the phase advance and thereby control the average voltage applied to the motor terminals. The polarity of the comparison signal determines whether motoring action or regeneration is to occur. Current feedback from the input lines is used to prevent combinations of SCRs from "turning on" and short circuiting the load.

3 Claims, 20 Drawing Figures

INVENTOR
EDWIN E. KOLATOROWICZ

ATTORNEY

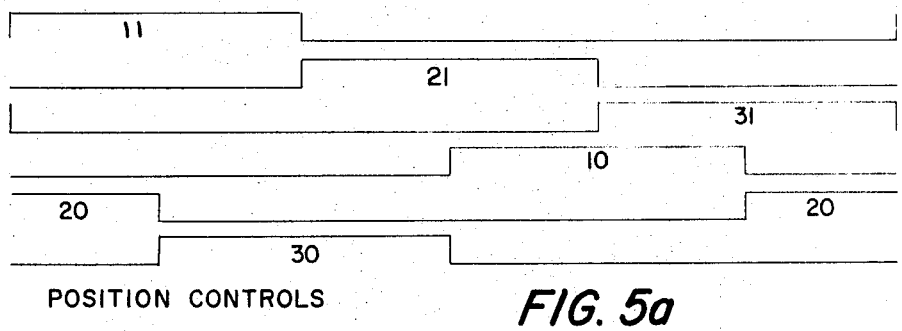
POSITION CONTROLS     *FIG. 5a*
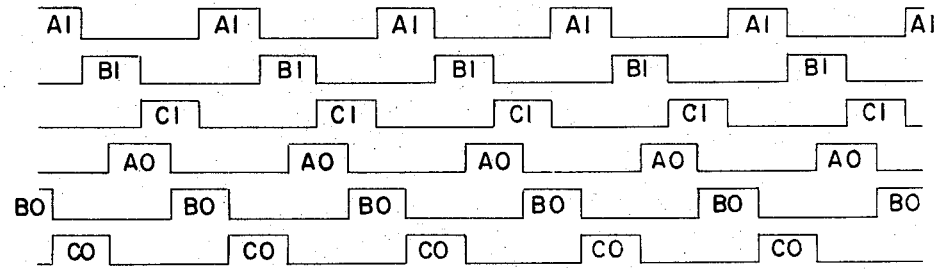
PHASE CONTROLS     *FIG. 5b*
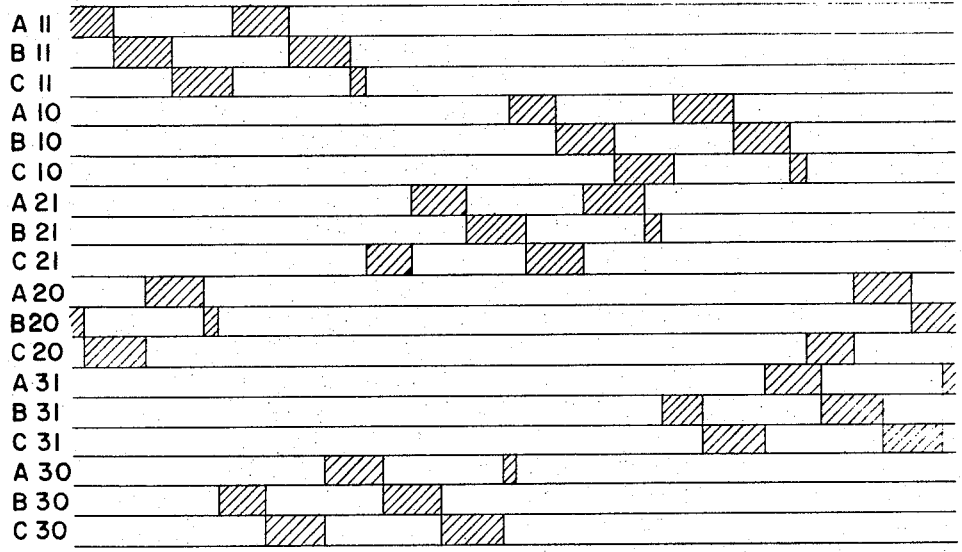
SCR FIRING SIGNAL     *FIG. 5c*
INVENTOR
EDWIN E. KOLATOROWICZ
ATTORNEY

INVENTOR
EDWIN E. KOLATOROWICZ

ATTORNEY

FIG. 9 PHASE CONTROL RING

INVENTOR
EDWIN E. KOLATOROWICZ

ATTORNEY

PHASE CONTROL TIMING

INVENTOR
EDWIN E. KOLATOROWICZ

ATTORNEY

POSITION SIGNAL INVERTER,
DIRECTION SENSING,
& F/R FLIP FLOP

BRUSHLESS DC ADJUSTABLE SPEED DRIVE WITH STATIC REGENERATIVE DC MOTOR CONTROL

CROSS REFERENCES TO RELATES APPLICATIONS

This invention relates to brushless adjustable speed motor drive systems of the general type described in an article entitled "The Thyratron Motor," published by Alexanderson and Mittag, in Electrical Engineering, November, 1934, PP, 1,517–1,523 and of the type described in my U.S. Pat. No. 3,418,550, issued Dec. 24, 1968, and assigned to the assignee of the present invention. More particularly, the present invention relates to improvements in brushless adjustable speed motor drive systems of the type disclosed in my aforementioned U.S. Pat. No. 3,418,550.

The present invention relates to controls for d-c motors and provides a static control circuit which permits braking of the d-c motor by means of regeneration. The term "static" signifies that the control utilizes electronic components rather than rotating machinery to apply and control power to the motor.

BACKGROUND OF THE INVENTION

My aforementioned U.S. Pat. No. 3,418,550 discloses a practical brushless direct current motor adjustable speed drive system capable of supplying considerable power, for instance, in the range of 5 to 100 (or more) horse power, while being competitive with known drive systems both as to size and cost, as well as efficiency with respect to power consumption, maintenance and reliability. The SCR converter of that patent is controlled by logic-gating means to combine the functions of power-line phase selection and the shaft position commutating function. The same SCRs participate in both functions.

The logic-gating circuits include multiple inputs which determine the presence of a single output to control one of the SCRs. Each of these gating circuits comprises a blocking oscillator whose output when present triggers one SCR, but whose triggering is controlled by multiple inputs, one of which is enabled by position sensing means, and others of which are enabled by phase control means referenced to the power lines. The particular SCR which is triggered is selected by the phase control means. The phase control consists of six unijunction transistor circuits synchronized to the three-phase a-c line with a delta-star transformer circuit. To achieve a continuous signal of sufficient width (120°), the unijunction transistor triggers a small SCR. The reset is controlled by the a-c synchronizing voltage in such a manner that the width which varies with advance is never below 120° in the operative range. This arrangement is only desirable for non-regenerative operation since, if the signals are 120° wide at maximum retard, an advance of more than 60° would cause firing signals to an incoming and outgoing SCR connected to the same line and short circuit the load.

Many applications of d-c motors require braking of the motor during operation. For example, extremely accurate speed control may require that the motor be braked as soon as it exceeds a desired speed. Other examples include d-c motors subjected to overhauling loads, as in crane, hoist and elevator service. The methods and apparatus employed for controlling such braking action have presented problems for many years. Where economy is desired, a simple mechanical brake is employed, but braking action is difficult to control. The use of an external electro-mechanical brake, such as an eddy current brake overcomes some of the problems associated with a mechanical brake, but on the whole, external brakes have generally proved unsatisfactory.

As a result, resort has been made to internal electrical braking such as plugging, dynamic braking or regenerative braking. Plugging involves the reversal of motor armature voltage and current and results in high circulating currents in the armature circuit. As a result of large thermal strains on the motor, repeated braking operations cannot be performed without danger of excessive heating and damage to the motor. In dynamic braking, a resistor is placed in the armature circuit. The motor in effect becomes a d-c generator supplying power to the resistor load. While the resistor limits the armature current and hence the thermal strain on the motor, it also decreases the effectiveness of the braking action, particularly at slow speeds. Thus, such an arrangement is not desirable where extremely accurate speed control is required or motors control low speed loads as in crane, hoist and elevator service.

Regenerative braking of d-c motors also employs the motor as a generator, similar to dynamic braking. However, it differs therefrom in that in regenerative braking the power generated by the motor is returned to the active power source for the motor rather than being circulated through a passive resistor load. Power may be regenerated by reversing the polarity of the armature voltage while maintaining armature current flow in the same direction or by reversing armature current flow while maintaining the polarity of the armature voltage. In either case, the motor that was formerly a load becomes a power source.

In a regenerative braking system, braking may be accomplished rapidly and on a permanent basis as opposed to plugging and dynamic braking which function for isolated stopping conditions. Also, with proper control, armature current may be limited so as to avoid excessive thermal strain on the motor.

For the foregoing reasons, regenerative braking is generally considered to be the most desirable method of braking. In the past the more conventional approach in prior art static regenerative d-c motor controls has been to reverse armature current while maintaining the terminal voltage of the d-c motor the same. However, this has necessitated two power supply circuits, one for each direction of current flow. This, of course, substantially increases the cost and also the complexity of the power circuit.

SUMMARY OF THE INVENTION

These and other disadvantages of the prior art are overcome by the present invention in which the armature is supplied from a controlled rectifier converter and in which the torque of the motor may be continuously varied from a maximum positive value to a maximum negative value with the controlled rectifier converter being controlled to effect retardation of the motor when the motor is being decelerated from a high speed to a lower speed, or when the motor is overhauled by its load.

Another important object of the present invention is to combine the functions of power-line phase selection with shaft position commutation and to provide a static control drive circuit in which the same controlled rectifiers participate in both functions without the necessity of additional power SCRs to permit the system to regenerate.

These and other objects and their attendant advantages will become apparent from the following description of the invention which provides an adjustable speed drive having controlled rectifiers arranged to commutate current to the stationary armature windings of a salient pole rotating field machine wherein the primary source of power is a polyphase a-c supply and speed is adjusted by phase-controlling the firing of the controlled rectifiers of the conversion unit connected to the motor armature windings. A position sensor associated with the motor governs the progressive energization of the motor windings, while the commutation of the controlled rectifiers is accomplished by the action of the a-c supply voltage and motor counter E.M.F.

DRAWINGS

For a fuller understanding of the invention, the description of the construction and mode of operation of the control circuits of the present invention should be considered in connection with the following drawings wherein like parts are identified by like reference characters throughout the several views, and which illustrate, by way of example, one illustrative embodiment of the present invention:

FIGS. 5a, 5b and 5c illustrate, respectively, position, phase control and firing signal relationships;

FIG. 14 is a schematic diagram of the gate driver circuit of the present invention, while

DESCRIPTION OF THE PREFERRED EMBODIMENT

Figure 1:
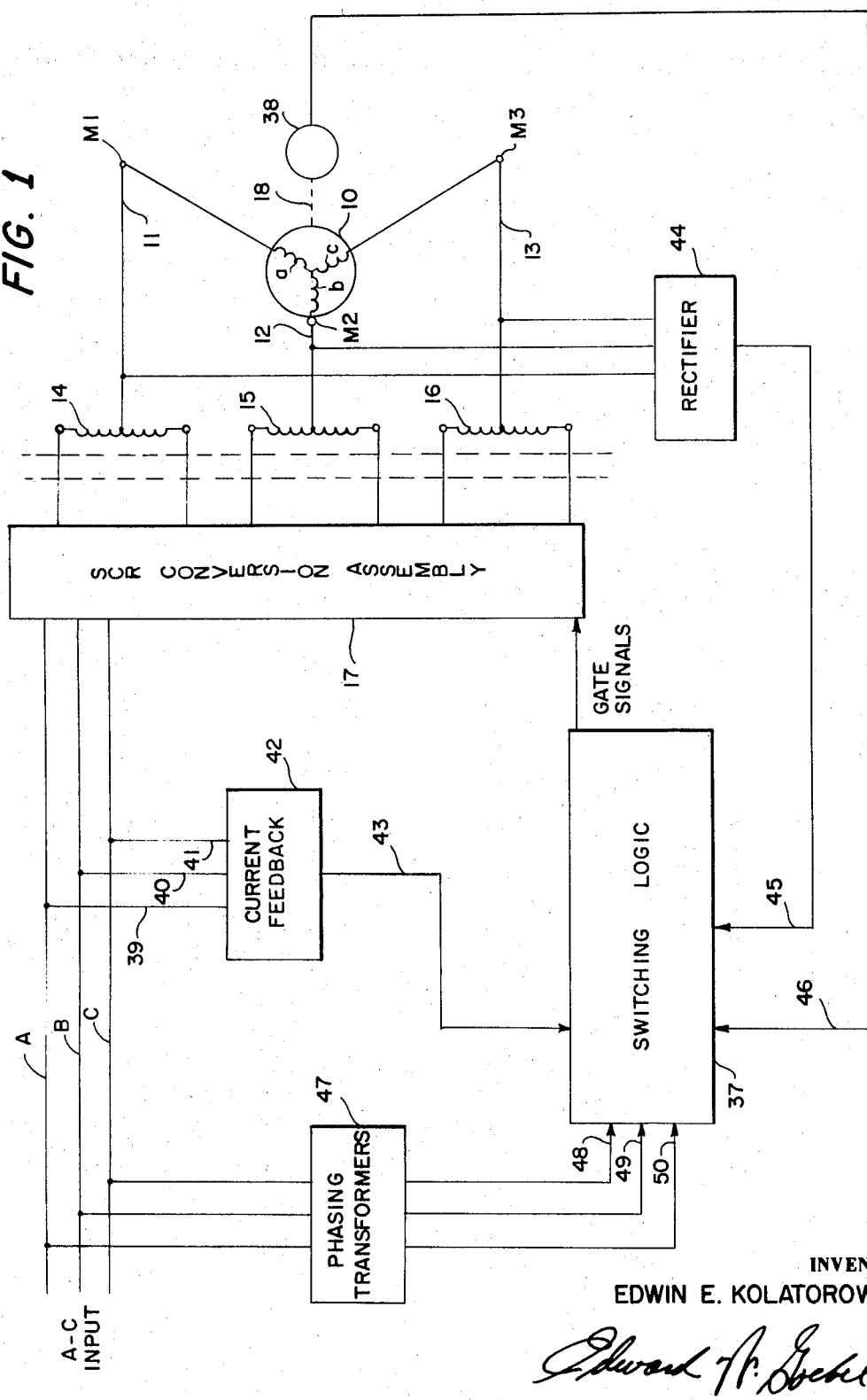
FIG. 1 is a diagram of the brushless d-c adjustable speed drive illustrating in block diagram form the static regenerative d-c motor control of the present invention.

Referring to the drawings, and in particular to FIG. 1, reference character 10 identifies generally a d-c motor having a permanent magnet rotor. The stationary armature is provided with three windings a, b and c each of which has one end connected to a common bus bar in a conventional manner. The other ends of these windings are connected to conductors 11, 12 and 13, respectively, which are in turn connected to intermediate tapping positions on reactors 14, 15 and 16.

The particular type of motor used can vary and the illustrative embodiment given by way of example has been selected for the purpose of eliminating any need to transfer current into rotating windings. This type of motor includes a stationary armature having plural windings which are externally commutated in order to provide a rotating field whose rotation is controlled by the shaft position sensor to lead the rotor by about 90 electrical degrees within the motor speed range. Any number of different motor structures can be used. For example, the permanent magnet rotor can be replaced by a wound salient-pole structure. To eliminate slip rings, a coaxial transformer can be used to transfer alternating current power to the rotating member, and rectifiers mounted directly on it can perform the required conversion to direct current.

Reactor windings 14, 15, and 16 are provided for the purpose of smoothing the current delivered to the motor from power lines A, B, and C. Windings 14, 15 and 16 also serve to limit short circuit current in the event of faulty SCR commutation. To this end, the reactor windings are closely coupled so that motor leg commutation is not impeded. The motor commutation is further assisted by amortisseur bars (not shown) inserted in the motor as described in my aforenoted U.S. Pat. No. 3,418,550. These bars serve the purpose of reducing the commutating reactance appearing at the motor winding terminals in a manner which is well known in the art.

The power drive to the motor 10 is supplied from a multiphase a-c power line including phases "A," "B" and "C." Because of the fact that the rotation rate of output shaft 18 of the motor is not in any way related to the frequency of the a-c power line, the present invention provides for line-phase switching by which the voltage applied to the motor windings through conductors 11, 12 and 13 from the a-c power lines is instantaneously selected by phase-control means so as to have the correct polarity, and also to be coupled to the winding at a phase instant which is correct to provide the average voltage necessary to maintain the selected motor speed. In the illustrative embodiment, both the phase selecting function and also the shaft position commutating function are carried out by the SCR conversion assembly 17.

Before proceeding with a detailed description of the logic control circuit, a clarification of the nomenclature used in the description will now be given with reference to FIG. 3. The a-c supply lines, as previously indicated, are labeled "A," "B" and "C," while the motor terminals are identified as M1, M2, and M3. The motor terminals M1, M2 and M3 are fed from the conversion unit 17 by way of the reactor which has three center tap windings 14, 15 and 16, all on a common core. Current flowing from the conversion unit into the motor winding "A" through motor terminal M1 flows through reactor terminal M11. Reactor terminals M21 and M31 feed motor terminals M2 and M3, and motor windings "B" and "C," respectively. Currents out of motor windings "A," "B" and "C," return to the reactor terminals M10, M20 and M30, respectively, for controlled and properly phased flow into the a-c supply lines "A," "B" and "C" through the appropriate SCRs. Thus it becomes apparent that those SCRs connected to one of the reactor terminals M11, M21 or M31 are active in conducting electric current to the motor 10. Conversely, those SCRs tied to one of the reactor terminals M10, M20 or M30 permit controlled current flow from the motor 10 to the a-c source.

Figure 3:
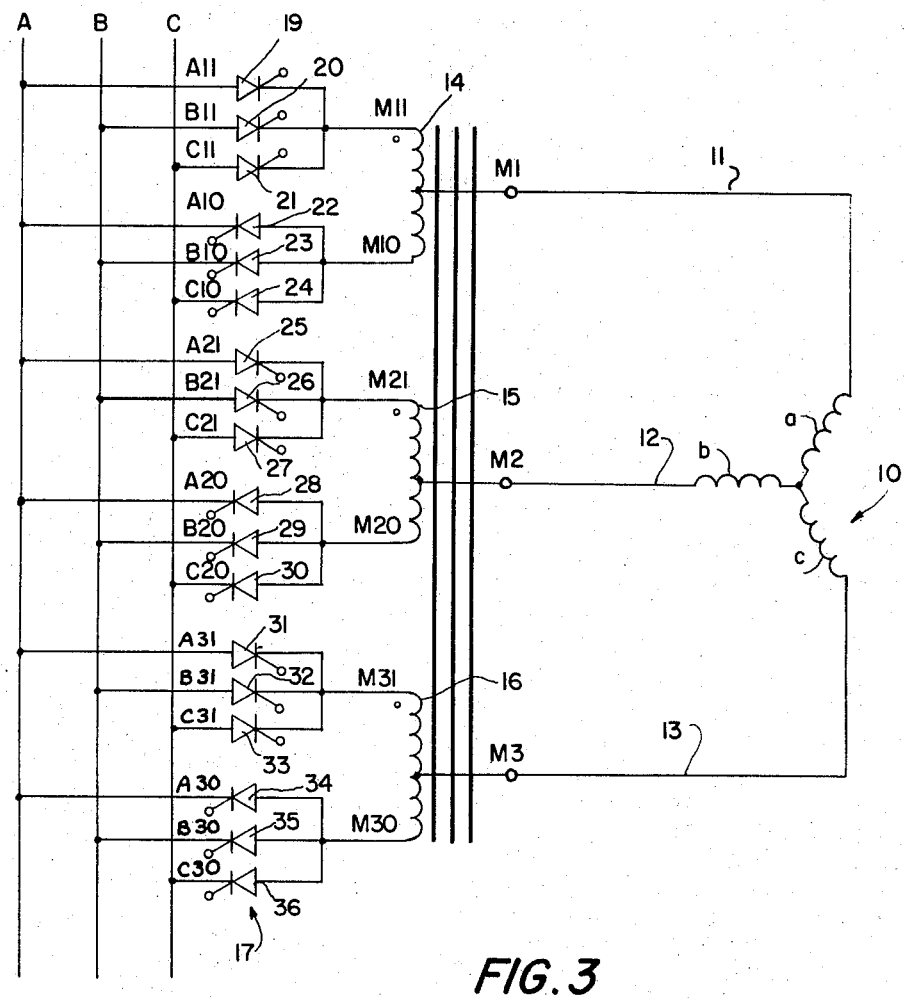
FIG. 3 is a schematic diagram of the SCR conversion and motor control drive circuit of the present invention.

As shown in FIG. 3, the SCR conversion assembly 17 comprises a quantity of eighteen silicon controlled rectifiers (SCRs), each bearing a reference numeral 19 through 36. These SCRs are selectively rendered conductive, several at a time, through a novel switching-logic system 37 as shown in block form in FIG. 1. The switching-logic system 37 takes the phase information from power lines "A," "B" and "C," the shaft-position information from a position sensor 38, a voltage feedback signal from the output of converter 17 and a current feedback from the input lines A, B and C and then selects and triggers the appropriate SCRs.

Current feedback is taken from the "A," "B" and "C" input lines from three current transformers via signal paths 39, 40 and 41 and rectified in current feedback stage 42 the output of which is applied to the switching logic system through line 43. The voltage feedback signal is derived from armature conductors 11, 12 and 13 and after processing in rectifier stage 44 is applied through line 45 to the switching-logic system 37 which also receives position signals through line 46. The momentary phase condition of the "A," "B" and "C" power lines is determined by phasing transformer stage 47 and the corresponding output signals are applied to the switching-logic system through conductors 48, 49 and 50. The angular position signal is derived from position sensor 38 driven by motor 10.

In order to monitor the momentary angular position of the motor shaft 18, a position sensor 38 is coupled to and driven by the shaft 18. This position sensor 38 may take the form shown in my aforementioned U.S. Pat. No. 3,418,550 in which the rotor position sensor comprises photo transistors spaced around a circuit board and facing in the direction of oppositely located light sources placed on the other side of an interposed light chopper which is turned by the motor shaft. This chopper is in the form of a disc having apertures through which the light sources, such as lamps, light emitting semiconductors or the like, can illuminate the photo transistors. For a six track position sensor, six outputs are provided which control the six groups of SCRs shown in FIG. 3. The six track information can alternatively be generated by three sensors which are then connected to logic means suitable for decoding six position-indicating outputs. Amplifying means attached to each position sensor provides an output signal whenever an aperture in the light mask disc is opposite the associated photo transistor. The amplifier connected to that transistor then delivers an enabling signal to a suitable firing circuit means which has its output applied to the switching-logic circuit.

The invention is not limited to this particular type of position sensing means and other forms may be utilized such as, for example, magnetic sensing devices, Hall-effect devices, capacitive devices, etc.

Figure 2:
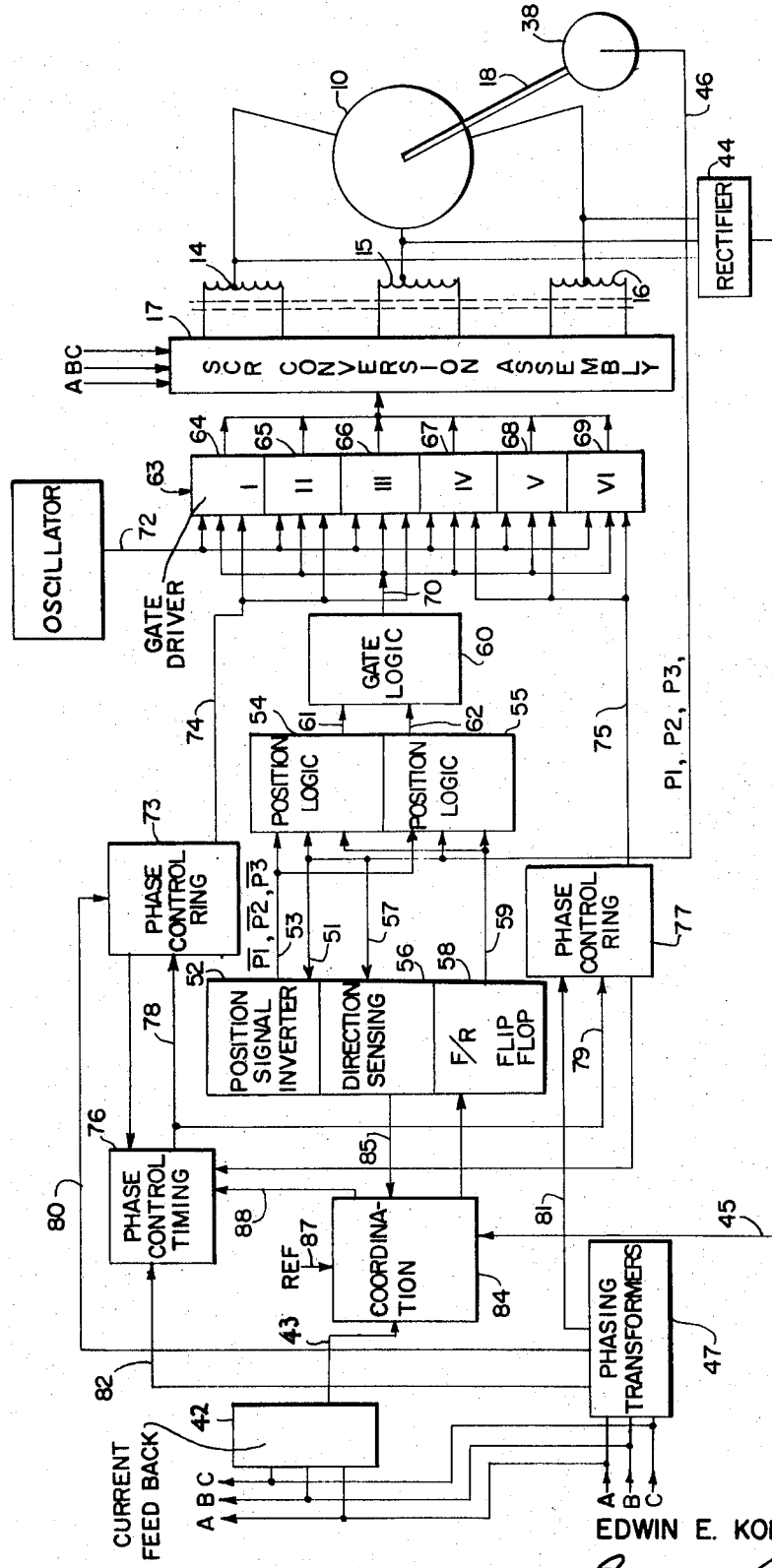
FIG. 2 is a block diagram showing in detail the switching logic stages which make up the d-c motor control of the present invention.

The switching-logic system 37 of FIG. 1, detailed in FIG. 2, comprises a number of stages built around NAND type logic circuits to enable groups of SCRs to provide regenerative as well as motoring operation of the motor 10 in a most economical and efficient manner. To this end, position signals P1, P2 and P3 generated by position sensor 38 are applied through line 51 to position signal inverter stage 52 which inverts the position signals. Output signals P1, P2 and P3 of inverter 52 are applied through line 53 to position logic stages 54 and 55. Position signals $\overline{P1}$, $\overline{P2}$ and $\overline{P3}$ are also applied to the position logic stages 54 and 55 as well as to the direction sensing circuit or stage 56 through line 57.

Position logic stages 54 and 55 generate six-track information from the three track information provided by the position sensor. At the same time, a forward-reverse (F/R) signal is applied from the F/R flip-flop stage 58 to each of the stages 54 and 55 through line 59. The outputs of the position logic stages 54 and 55 are applied to the gate logic stage 60 through lines 61 and 62, respectively. Gate logic stage 60 generates a single enabling signal for each of the six SCR groups. Actually, however, each SCR group is enabled by two combinations of signals. One combination corresponds to motoring operation in the first quadrant and to regenerative operation in the fourth quadrant of operation. The other combination corresponds to motoring operation in the third quadrant and to regenerative operation in the second quadrant of operation. The single enabling output gate signal for each of the six SCR groups is generated in stage 60 and is applied to the SCR converter for firing of the SCRs in the proper sequence through gate drivers 64–69. Inputs to the gate drivers, in addition to the enabling signal applied through line 70, include the output of oscillator 71 applied through line 71 and the output of the phase control rings 73 and 77 applied through lines 74 and 75.

The phase control system comprises the phasing transformers 47 and its associated filters, timing stage 76 and two phase control ring stages 73 and 77 which insure that the trigger pulses follow the desired sequence of operation. The output trigger pulses of the timing stage are applied to phase control rings 73 and 77 over lines 78 and 79 and are phase displaced with respect to each other by 180°.

Sync signals are derived in phasing stage 47 and are applied to the phase control rings 73 and 77 over lines 80 and 81, respectively, and to the timing stage 76 over line 82. The current feedback stage 42 provides a voltage proportional to current flow and also provides a clamp signal for the F/R flip-flop through a coordination circuit 84. The coordination circuit allows four quadrant operation. To this end, direction reference signals are applied thereto from the direction sensing stage 56 through line 85, while current feedback signals from the input lines "A," "B" and "C," and voltage feedback from the motor windings are applied through lines 43 and 45, respectively, with a reference command input being applied at 87. The output control signal is applied through line 88 to stage 76 to control the average voltage applied to the motor 10 that its speed may be thereby governed. Signals from the coordination circuit 84 also control the action of the F/R flip-flop 58, being connected thereto by a line 89.

Figure 4:
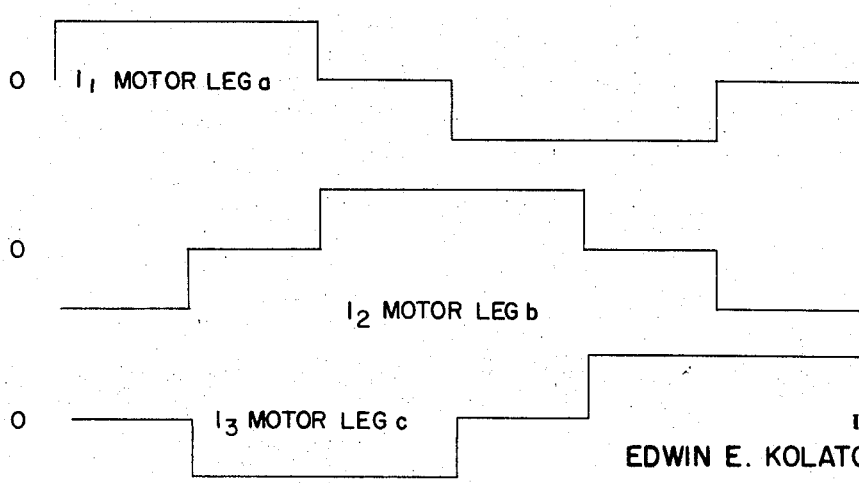
FIG. 4 is a graphical representation of motor leg currents.

The operation of the drive circuit will be described first without reference to regeneration. FIG. 4 indicates the theoretical motor current as a function of time in each of the motor windings a, b, and c. The current waves as illustrated do not show ripple caused by the a-c lines or overlap during commutation. The current is shown for one electrical cycle referred to the motor windings, i.e., one-half of a revolution of a four-pole motor. The timing interval is dependent on the motor speed and bears absolutely no relation to the a-c power line frequency.

When current is flowing into motor terminal M1, FIG. 3, the current is being supplied through one of the SCRs 19, 20, or 21, through corresponding input line A11, B11 or C11. The operative SCR is dependent upon the relative polarity of the a-c lines at any instant, as well as the output of the phase control rings 73 and 77, FIG. 2, which along with the position logic circuits 54 and 55 develops the group-enabling signals applied to the gate drivers 64–69.

To this end, one phase control output is channeled to, for example, SCRs 19, 25 and 31, FIG. 3; however, the output signal from the position sensor 38, FIG. 2, determines which of these three SCRs actually receives a gate signal. In other words, each gate signal is a function of the a-c line phase voltage and the position of the shaft of the driven motor. At any instant of time, two phase control outputs are present as are two driving gate signals.

FIGS. 5a–5c graphically represent a possible sequence of position control signals, phase controls signals and SCR gate firing signals. The total time base for FIGS. 5a–5c shows one electrical cycle of the machine. Assuming that the machine is a four-pole machine and that the line frequency is 60 Hertz, the indicated speed is 360 rpm.

Figure 6:
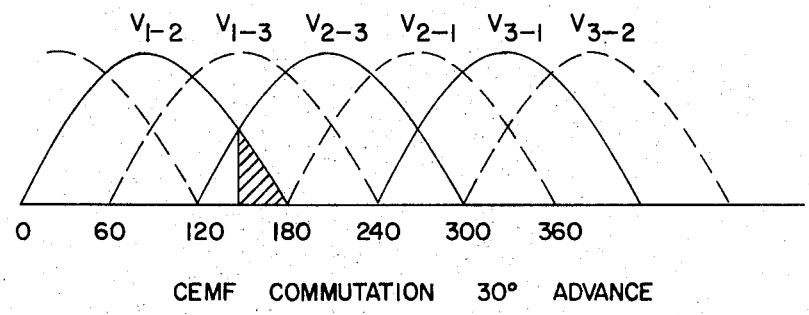
FIG. 6 is a graphical representation of CEMF commutation with 30° advance.

Motor 10 counter-emf at no load is shown in FIG. 6. For maximum production of torque, current must flow against the maximum counter-emf. For example, referring to FIG. 6, current flow would be initiated into motor winding a at 60°. For the first 60° interval, that is, from 60° to 120° it would flow out of winding b and for the next 60° interval (120° to 180°) it would flow out of winding c. However, the position sensor 38, FIG. 2, is advanced so as to effect commutation with counter-emf.

Figure 7A:
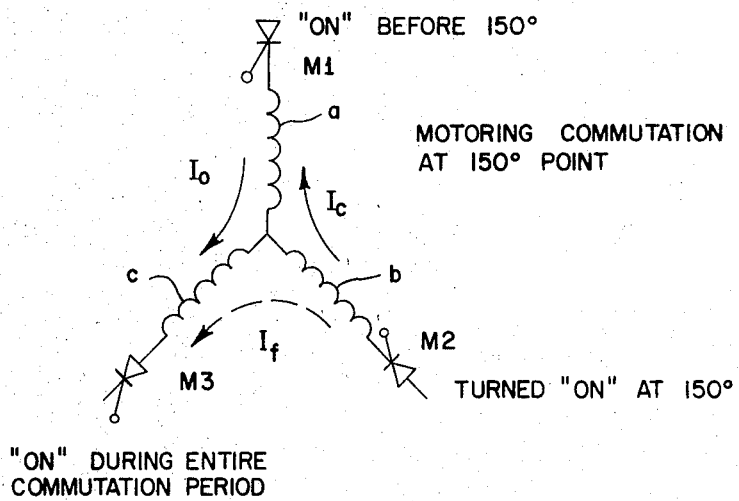
FIGS. 7a and 7b illustrate regenerating motor leg commutation at the 150° point.

A commutation event is illustrated in FIG. 6 by the shaded area between 150° and 180° and FIGS. 7a a and 7b illustrate the motor currents for motoring and regenerating commutation, respectively, at 30° advance.

The original current is designated $i_o$ and the desired current is $i_f$. By setting up a circulating current $i_c$, the current in leg a will go to zero when $i_c$ becomes equal to $i_o$. This is initiated by enabling the group of SCRs which feeds current into motor winding b through SCR group 21. Concurrently, the gate signals are removed from SCR group 11 and the motor voltage V1–2, that is the voltage across windings a, b, if positive, would cause the fictitious current $i_c$ to flow. By enabling the SCR group 21 at 180° on the CEMF chart, it can be seen that the voltage V1–2 starts to go negative. Since this would impede commutation, the signal enabling SCR group 21 is advanced by 30° for commutation as represented by the shaded area of FIG. 6 representing volt-seconds.

As hereinbefore noted with reference to FIG. 3, the 18 SCRs are connected together in groups of three so that there is a total of six groups, each one of which is partially under control of one of the position sensor outputs, through the position logic 54 and 55, FIG. 2, and gate logic 60 circuits. For convenience, the position sensor outputs are labeled P1, P2, P3. The use of a three track position sensor system arranged so that only one output of the three changes at any instant avoids ambiguity at transfers. The three track information is conveniently converted to 6 track information in the position logic stages 54, 55, the outputs of which control the gate logic 60.

The firing control is implemented in the position logic stages 54 and 55 by NAND circuits. Direction of rotation is controlled by the F (forward) and R (reverse) output signals of flip-flop 58. F equals 1 when R equals zero and vice-versa, so that F is on for forward motoring or regeneration when the motor is rotating in a reverse direction.

Figure 8:
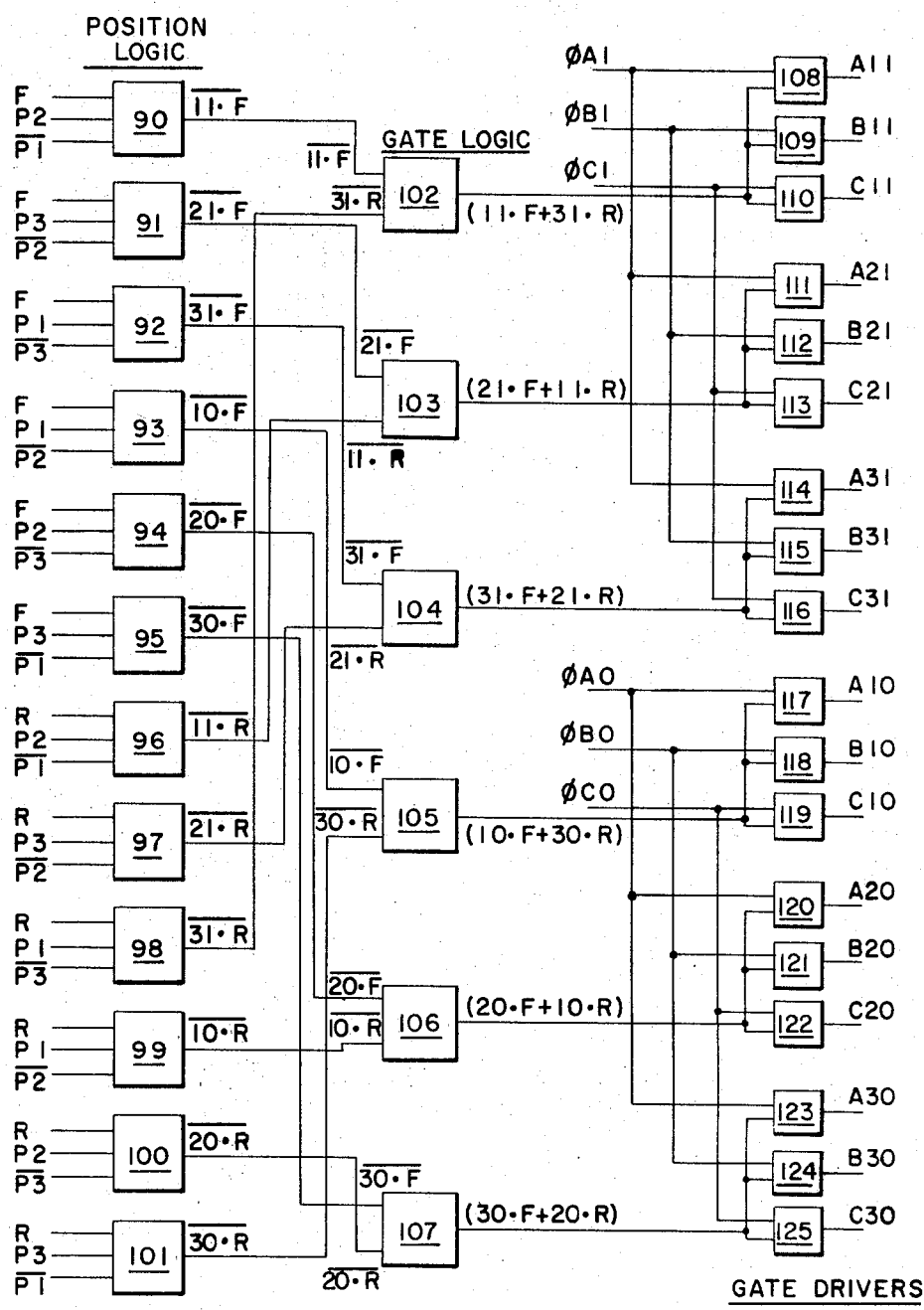
FIG. 8 is a detailed block diagram of the position logic, gate logic and gate drive circuits of the present invention.

As shown in FIG. 8, the position logic stages comprise 12 NAND circuits 90–101, each of which receives a position signal P1, P2 or P3, an inverted position signal $\overline{P1}$, $\overline{P2}$ or $\overline{P3}$ and either a forward (F) or a reverse (R) rotation command signal from flip-flop stage 58 of FIG. 2. The output signals from the position logic NANDS 90–101 are applied to six 2 input NAND circuits 102–107. Stages 102–104 have their outputs applied to the gate drivers which control the SCRs conducting current to the motor 10. Stages 105–107 control the SCRs conducting current from the motor 10 to the a-c input. The output of each gate logic stage is applied to each of the gate drivers of a group. For example, the output of stage 102 is applied to gate drivers 108–110, the output of 103 is applied to gate drivers 111–113. Gate drivers 114–125 are similarly enabled.

Thus, the gate logic NAND circuits 102–107 sift the position and direction selection signals down to six signals which enable the SCR gate driver groups I–VI, FIG. 2, as required. These enabling signals along with the phase control signals $\phi A1$, $\phi B1$, $\phi C1$ and $\phi A0$, $\phi B0$, $\phi C0$ from the phase control ring circuits 73 and 77 control the gate driver circuits 64–69.

While the above operation has been described with respect to use of 30° advance, it should be apparent that increase of phase advance is possible. For increased torque, 45° advance is desirable. However with 45° advance, the position SCR group enabling is shifted by 90°, and six position detection per electrical cycle for both directions of rotation is impractical. Resort may then be had to detecting 12 or more positions. This could be achieved by four tracks ($2^4 = 16$) or six tracks ($2^6 = 64$). In an arrangement using six tracks, the head of the three track sensors may be duplicated. It should be apparent however that changes in logic from the three track system would require certain changes in the internal logic in setting up the proper cyclic code.

As shown in FIG. 5, a particular phase-control output may be called upon to fire more than one SCR before the next phase-control output goes on. This requires that the phase-control signals be continuous for 120° of the a-c line and not of the motor frequency. Also, the phase-control signals must be capable of being phase shifted by 150° to cover a full motoring to a full regenerating range with a 30° commutation margin.

The logic thus far described permits operation in the first and fourth quadrants. F/R flip-flop stage 58, FIG. 2, provides a forward/reverse (F/R) signal which establishes the desired direction of rotation. Assuming the drive is set up for forward motoring and the drive motor 10 is driven in a reverse direction by an external force, regeneration is achieved.

With reference to FIG. 7a, as hereinbefore noted, SCRs of group 11, i.e., SCRs 19, 20, and 21, are enabled from 30° to 150°. At 150° to 270°, SCRs 25, 26 and 27 of group 21 are enabled. In the vicinity of 150°, the outgoing group is 30 and SCRs 34, 35 and 36 are enabled. In the reverse or R mode, SCRs 25, 26 and 27 of group 21 are enabled from the 30° to 150° interval. SCRs 31, 32, and 33 of group 31 are enabled from 150° to 270° and SCRs 22, 23 and 24 of group 10 are on in the vicinity of 150°. Just prior to 150°, motor terminal M1 is positive with respect to M2 and power could be transferred from the motor to the line through SCR groups 21 and 10. The phase control is phased back so that the motor is looking into a negative voltage. Phasing forward decreases the negative voltage that the motor sees and the regenerative current increases. Phasing forward far enough results in a net power flow being from the line to the motor (plugging). If, during this process, the direction is reversed, the motor voltage has changed phase by 180° and the positive voltage is sending current against the less positive CEMF so that the drive is in a motoring mode.

Figure 7B:
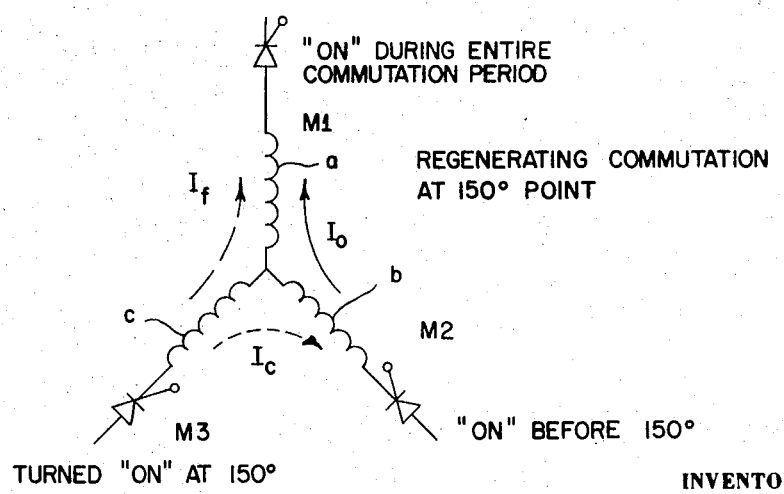

The above description ignores leg-to-leg commutation in the motor. However, referring to FIG. 7b, it will be recalled that at 150°, rectifier group 31 is enabled and motor terminal M2 is positive with respect to motor terminal M3. This causes the current $i_c$, the fictitious commutating current, to flow. When $i_c$ becomes equal $i_o$ the commutation is completed. In motoring commutation with 30° advance, the open circuit voltage at the inception of commutation is one-half the maximum voltage and decreases to zero 30° later. In regenerating commutation, the voltage is also one-half of the maximum, but increases with time. Thus, more current can be commutated in the regenerative mode. This is similar to the situation that occurs with a 45° advance.

A transition from generating to motoring can be made smoothly with no change in the enabling signal if the motor changes direction in the process. With a transition from motoring to regenerating with no change in direction of rotation of the motor 10, the enabling scheme is changed to accommodate selective rotation. A change of enabling always involves turning on an outgoing group when its companion incoming group is on or vice-versa. This results in short circuiting the line with the choke. To avoid the short circuit, the changes are locked out until the current has been reduced to zero which is effected by its feedback phase control and coordination circuits.

All of the 18 SCRs 19–36 are used in each quadrant of operation and the same phase control operates in all quadrants.

Figure 9:
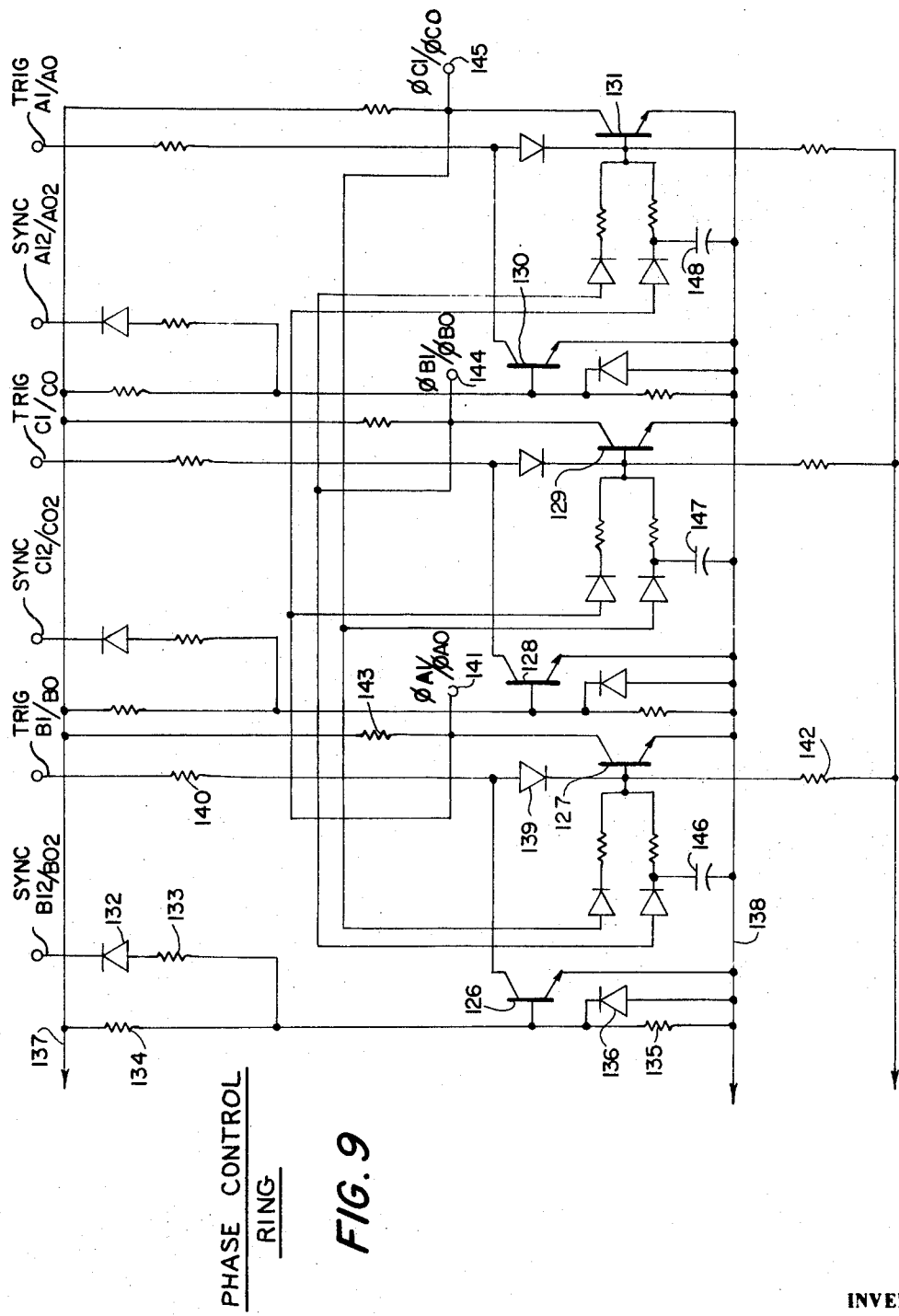
FIG. 9 is a schematic diagram of the phase control ring circuit of the present invention.

The phase control system comprises a Delta-Wye phasing transformer stage 47, FIG. 2, which is used for developing synchronizing voltage outputs applied to the timing stage 76 and phase control ring stages 73 and 77. The ring stages are shown in greater detail in FIG. 9. Each phase control ring stage is identical and includes six transistors 126, 127, 128, 129, 130 and 131 operably arranged in pairs to provide the phase trigger outputs $\phi A1$, $\phi B1$, $\phi C1$ and $\phi A0$, $\phi B0$, $\phi C0$ to the gate driver stages. For convenience, the output terminals 141, 144 and 145 are indicated as having both the $\phi A$ and $\phi B$ phase control signals; however, it should be apparent the ring 73 develops signals $\phi A1$, $\phi B1$ and $\phi C1$ while ring 77 develops the $\phi A0$, $\phi B0$ and $\phi C0$ output signals.

To this end, one sync input B12 or B02 is applied through diode 132 and series connected resistor 133 to the base of input transistor 126. The base electrode of transistor 126 is connected to the junction of resistor 134 and the parallel combination of resistor 135 and diode 136, which form a voltage divider across the 20 v supply connected to positive bus 137 and common line 138. The collector electrode of transistor 126 is connected to bias the base of transistor 127 through diode 139. The base of transistor 127 also has applied thereto a trigger pulse input B1/Bo from phase control timing stage 76.

The trigger pulse B1/Bo applied to the base of transistor 127 through resistor 140 and the diode 139 serves to turn the transistor 127 ON. An output signal $\phi A1/\phi A0$ is developed and taken at terminal 141 connected to the collector electrode of transistor 127. The collector electrode of transistor 127 is returned to the base electrodes of transistors 129 and 131 through series resistor-diode combination. The collector electrode of transistor 131 is returned to the base of transistors 127 and 129 through similar series resistor-diode combinations. Likewise, transistor 129 also has its collector returned to the base electrode of transistors 127 and 131 to complete the ring. The transistors 127, 129 and 131 have their respective bases connected to a negative supply line through resistor 142 and its counterparts and their respective collector electrodes connected to a positive bus 137 through resistor 143 and its counterparts.

In operation, assuming an output $\phi A1$ at terminal 141, transistor 127 is biased OFF. In the meantime, transistors 129 and 131 are ON to clamp terminals 144 and 145 at essentially ground or common potential. To obtain an output at terminal 144, ($\phi B1$), a trigger pulse is applied to the base of transistor 127 and with the proper sync pulse applied to transistor 126 transistor 127 is caused to turn ON.

With terminal 141 clamped to common potential, transistors 129 and 131 start to turn OFF. Capacitor 148 insures that transistor 129 turns OFF first by delaying the turnoff of transistor 131. When transistor 129 turns OFF the potential at terminal 144 will hold transistors 127 and 131 ON by way of the associated resistor-diode combinations. The interconnection of transistors 127, 129 and 131 is such that only one of them can be OFF at any time so that a voltage appears at only one of the terminals 141, 144, or 145. Turning the OFF transistors ON will cause the next transistor to turn OFF. Capacitors 146–148 insure proper sequence.

Transistors 126, 128 and 130 clamp the unwanted pulse. These transistors are normally ON and clamping, except when the sync input is negative enough to overpower the ON bias of resistors 134. When a $\phi A1$ signal is desired, the trigger pulse is used to turn off the previous output which in this case is $\phi C1$, and the trigger pulse A1 is directed to the base of transistor 131. The A0 trigger pulse is on the same line, but is clamped by transistor 130. Sync voltages are developed by the phasing transformers 47, FIG. 1. Trigger pulses on the same line as $\phi A1$ and $\phi A0$ are 180 electrical degrees apart with respect to the a-c input.

Figure 10:
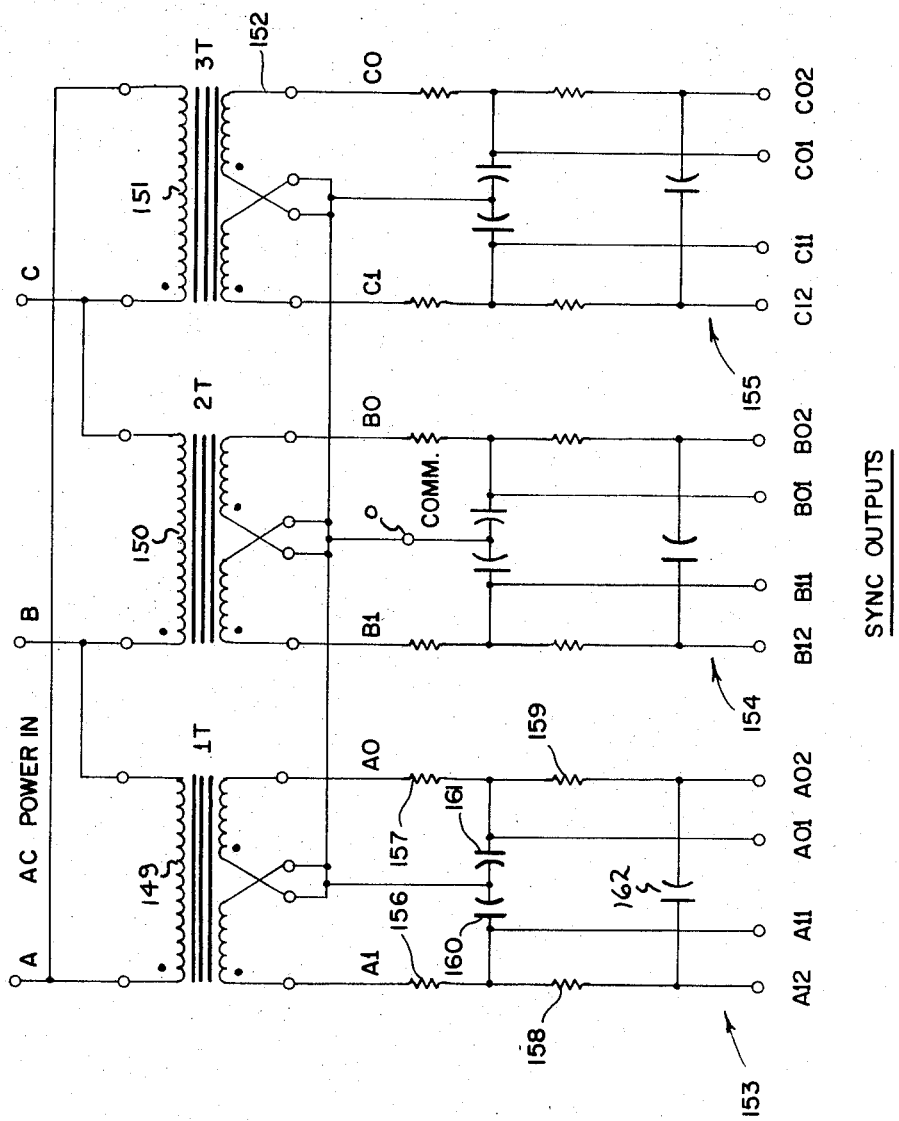
FIG. 10 is a schematic diagram of the phase shift and filter control circuits of the present invention.

In order to determine the momentary phase condition of the power line, transformer means is used as a part of a phase-sensing expedient. At the convenience of the circuit designer, either three separate transformers can be used, one for each phase, or a single three-phase transformer can be used. The present illustrative embodiment, as shown in FIG. 10, is of the former type and uses three phase sensing transformers 1T, 2T and 3T. These transformers have their primary windings 149, 150 and 151 delta-connected to the power lines "A," "B" and "C," with star-connected secondary windings such as 152, including a neutral center labelled "0." The windings of the secondary are respectively labelled $A_0A_1$, $B_0B_1$, and $C_0C_1$ at their output terminals. The primary and secondary windings are magnetically coupled through permeable cores 1T, 2T, 3T, so that the outputs at the above listed six terminals of the secondary 152 have amplitudes and polarities which change instantaneously as the power lines "A," "B" and "C" proceed through their excursions at line frequency. The outputs at these six terminals of the secondary 152 are used to supply information to the switching logic 37, FIG. 1, to identify which of the phase legs in FIG. 3 should be supplying power to the motor 10 through the SCRs at any particular instant of time.

These outputs $A_0A_1$, $B_0B_1$ and $C_0C_1$ are connected as shown in FIG. 10 to three phase shift filter circuits 153, 154 and 155, one of which is connected to each of the secondaries. Each of the six outputs from the secondaries 152 of the phasing transformer is shifted at least once. For example, A11 is voltage A1 with a single shift, A01 is voltage A0 with a single shift. A12, A02, etc., are phasing signals with additional shifts provided for alternate trigger pulse suppression.

Each phase shift circuit includes resistors 156 and 157 connected at one end to the output terminals of a secondary winding. The other ends of resistors 156 and 157 are connected directly to their output terminals A11, A01, respectively, and also through resistors 158, 159 to output terminals A12 and A02. Capacitors 160 and 161 connected between the common terminal and the other ends of resistors 156 and 157 reduce noise spikes appearing on the phasing signals with single shifts. Similarly, a capacitor such as 162 is connected between the output terminals A12 and A02.

Figure 11:
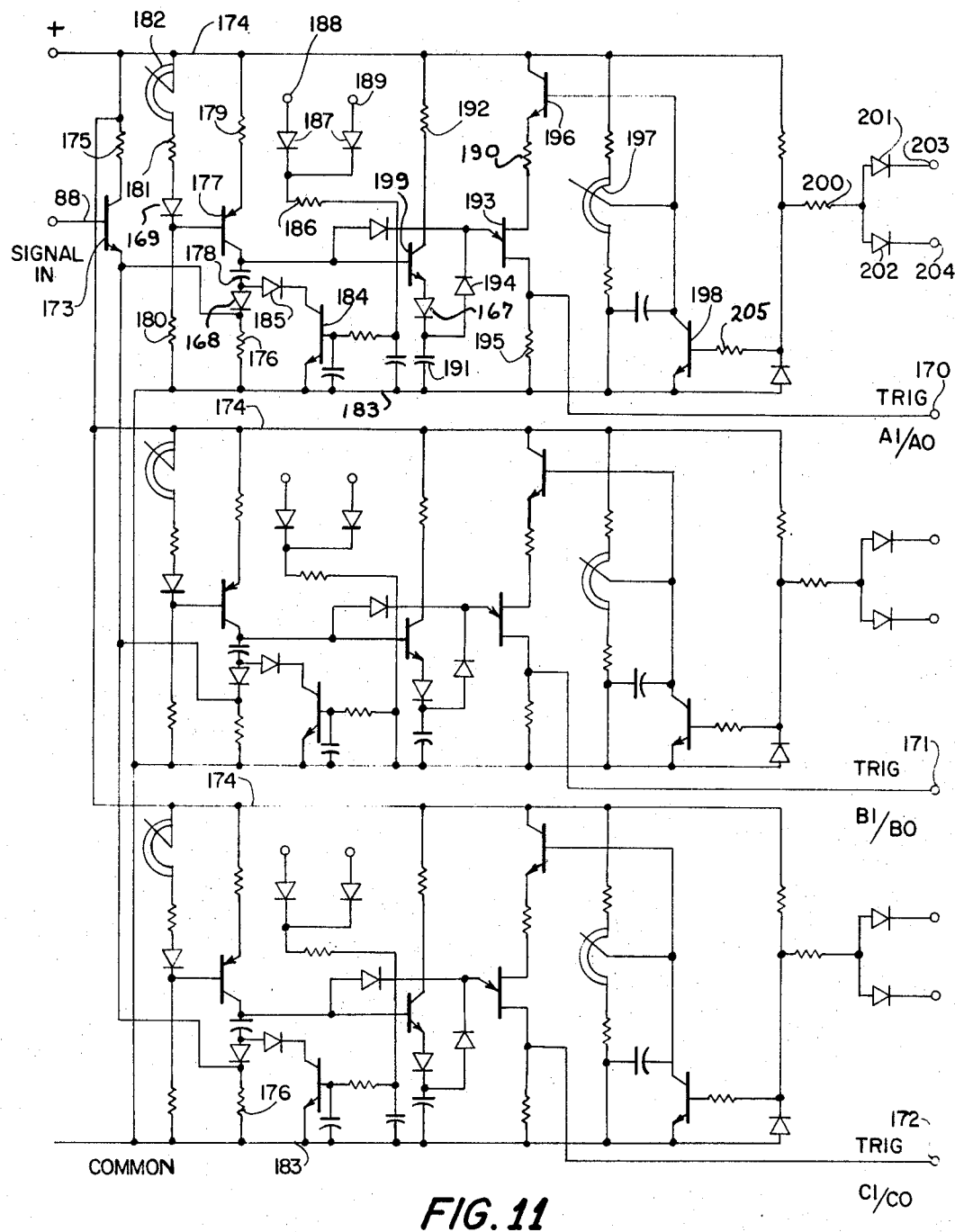
FIG. 11 is a schematic diagram of the phase control timing circuit of the present invention.

The phase control timing circuit 76 of FIG. 2, and detailed in FIG. 11, provides three trigger outputs A1/A0, B1/B0, C1/C0 at terminals 170, 171 and 172, respectively. Each output has output pulses at 180° intervals. One pulse is for phase control ring 73 ($\phi A1$, $\phi B1$, $\phi C1$), and the other pulse is for phase control ring 77 ($\phi A0$, $\phi B0$, $\phi C0$). A control signal is applied at terminal 88 to the base of transistor 173 connected in an emitter-follower configuration. The collector electrode of transistor 13 is connected to the positive bus 174 through voltage dropping resistor 175. The emitter is coupled directly to each of three resistors 176 in the A, B and C trigger circuits. All trigger circuits are identical and, thus, reference will only be made to the "A" circuit.

Transistor 177 controls the charging current of capacitor 178 which is connected between the collector electrode and the resistor 176. The emitter electrode of transistor 177 is connected to the positive bus through resistor 179. Bias voltage to the base electrode is supplied through its voltage divider comprising resistors 180, 181 and 182 series connected with a diode 169 between the positive bus 174 and the common return line 183.

The pedestal signal from transistor 173 may be suppressed by turning ON clamping transistor 184 which has its collector electrode connected to the junction of diode 168 and capacitor 178 through diode 185. The emitter electrode is returned directly to the common line, and the base is connected through a pi filter, resistor 186 and diodes 187 to trigger terminals 188, 189.

The slope of the ramp voltage of capacitor 178 is controlled by transistor 177 and is applied to the base of transistor 199 which controls the charging of capacitor 191 through its emitter-collector junction and resistor 192. Capacitor 191 is permitted to charge to a voltage value somewhat below the sum of the ramp and pedestal voltages. This voltage value initiates firing of the unijunction transistor 193, and capacitor 191 discharges through diode 194 to provide energy for the trigger pulse. The trigger pulse is applied to terminal 170 and is taken across the resistor 195 connected to the lower base, as viewed in the drawing, of the unijunction transistor 193. The other base electrode is returned to the positive bus through a resistor 190 and a transistor 196 connected in an emitter-follower configuration. The base of transistor 196 is connected to a potentiometer 197 in a voltage divider string which permits adjustment of the voltage across the unijunction transistor 193.

Transistor 198 is used for synchronization and assures a tail end pulse. To this end, the base electrode of transistor 198 is connected through resistors 200 and 205 and through diodes 201 and 202 to input terminals 203, 204. To this end terminals 203 and 204 have applied thereto a-c voltages which are phase displaced by 180°. Twice during a cycle there is not enough negative voltage to overpower the base supply from the positive bus and the unijunction transistor 193 dips. Balance of the phases is adjusted by controlling the ramp slope through the setting of rheostat 182 in the base circuit of transistor 177 and by adjusting the potentiometers 197 so that the unijunction transistors 193 in all phases fire at the same voltage.

Figure 12:
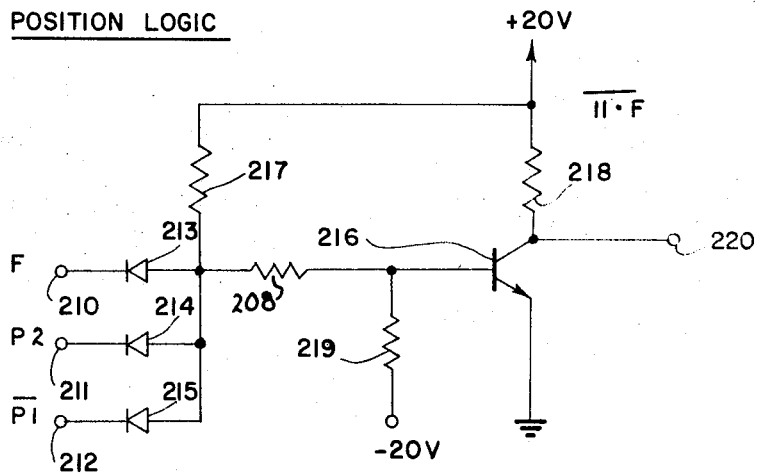
FIGS. 12 and 13 are schematic diagrams of single stages of the position logic and gate logic NAND circuits of the present invention.

Once the correct phase control and enabling signals are available the proper gate signals are generated in the position logic stages 54, 55 of FIG. 2 and in the gate logic stage 60. Referring to FIG. 12, the position logic stage is based on NAND type circuits, each adapted to receive a forward (F) or reverse (R) signal input at terminal 210, a position signal P at terminal 211 and an inverted position signal $\bar{P}$ at terminal 212. The signals are applied through diodes 213, 214 and 215 which have their anodes connected in common to the base of transistor 216 through a resistor 208. Resistors 217, 218 and 219 establish the proper bias levels for transistor 216 operation, and the output is taken from the collector and applied to terminal 220.

Figure 13:
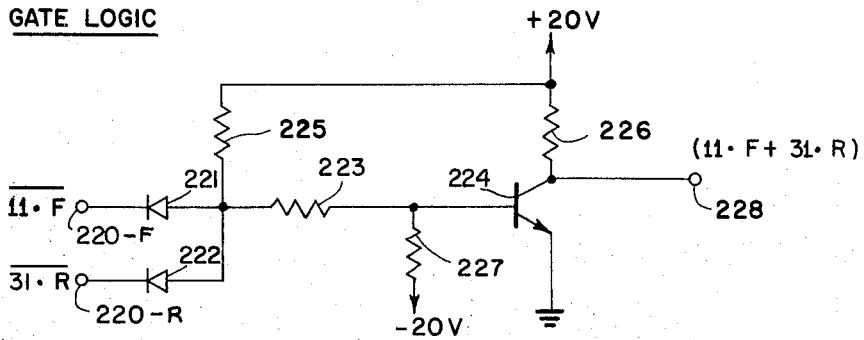

This output forms one input on the terminal 220–F of the two input gate logic stage shown in FIG. 13. Since this input corresponds to the group 11 SCRs for forward operation, the other input at terminal 220–R must correspond to the group 31 SCRs for reverse operation and is derived from position logic stage 98, as shown in FIG. 8. The gate logic stage is essentially the same as the position logic with the exception of one less input. The inputs are applied through diodes 221, 222, and resistor 223 to the base of transistor 224 which is operably biased through resistors 223, 225 and 227.

Figure 14:
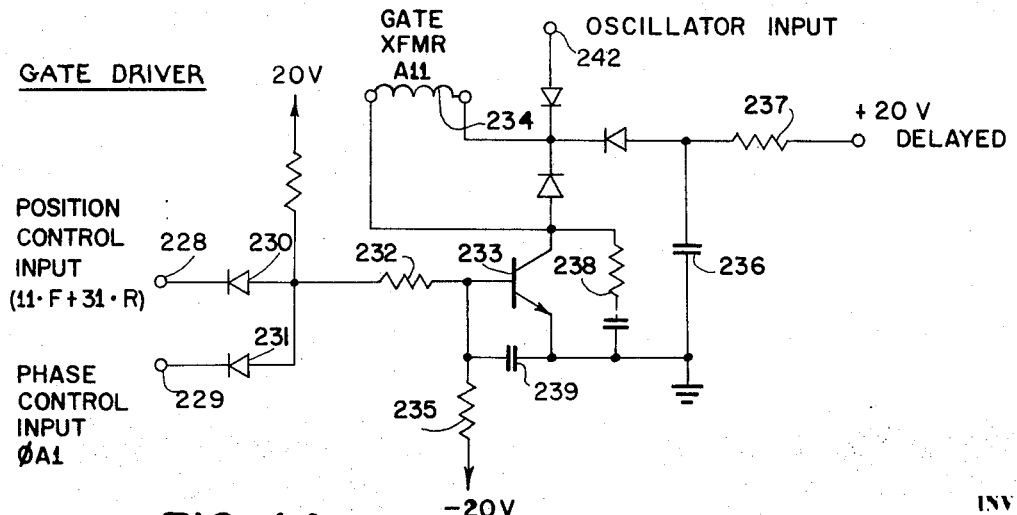

The output of a gate logic stage is applied to its gate driver, a schematic representation of which is shown in FIG. 14. Each gate driver drives an associated SCR and receives both position control information from the gate logic circuits at terminal 228, and phase control information at terminal 229 from the phase control ring. The circuit resembles a NAND configuration and the impulses are applied through diodes 230, 231 and resistor 232 to the base electrode of transistor 233. Bias levels are established by resistors 232 and 235. The output of transistor 233 is inverted from a normal NAND, because the output signals are applied to a primary winding 234 of an associated gate transformer by completing a path to common or ground. The signal is ON, i.e., the transformer is pulsed, when the position and phase control inputs are ON (not grounded). Resolution may be improved by capacitor 236 which generates a "head end" pulse. Capacitor 236 is charged through resistor 237 by the 20 v d-c supply. The supply may be delayed to suppress gate pulses until all logic stages are in their proper states. Resistor-capacitor network 238 and capacitor 239 may be provided in the event of excessive noise feedback from the pulse transformers.

Figure 15:
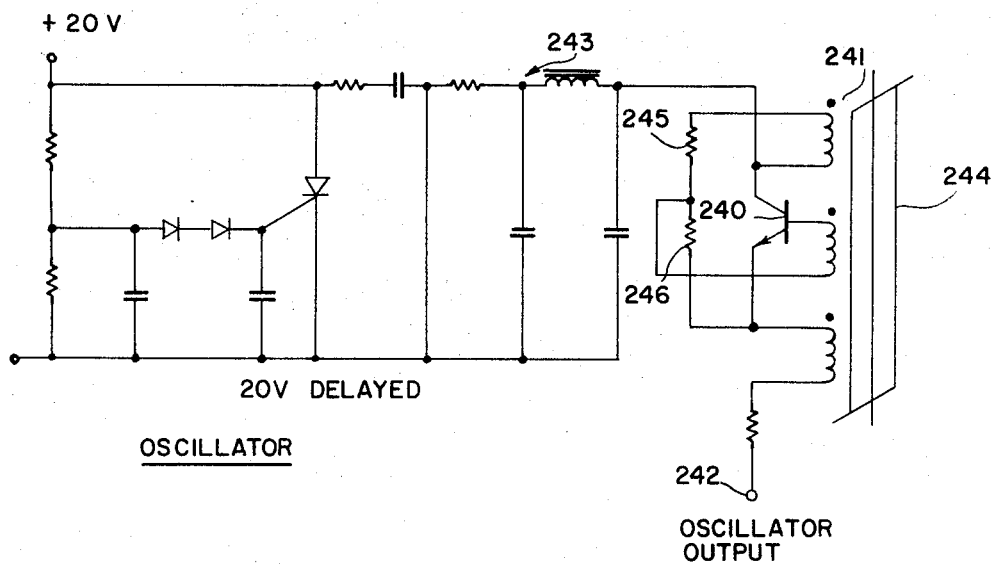
FIG. 15 illustrates schematically the associated oscillator circuit.

The oscillator stage 71, FIG. 1, is shown in detail in FIG. 15. The oscillator trigger circuit includes a transistor 240 connected to drive the feedback transformer 241 to provide a trigger signal at terminal 242. An LC pi network 243 is used to store enough energy so that the power supply need only deliver the average power. The 20 volt d-c delayed supply is also used for application of the input power to the oscillator. The repetition rate of the oscillator is advantageously set at about 20 KC, with a pulse width of about 15 micro seconds. The frequency and repetition rate are set by core 244 and resistors 245 and 246.

Figure 18:
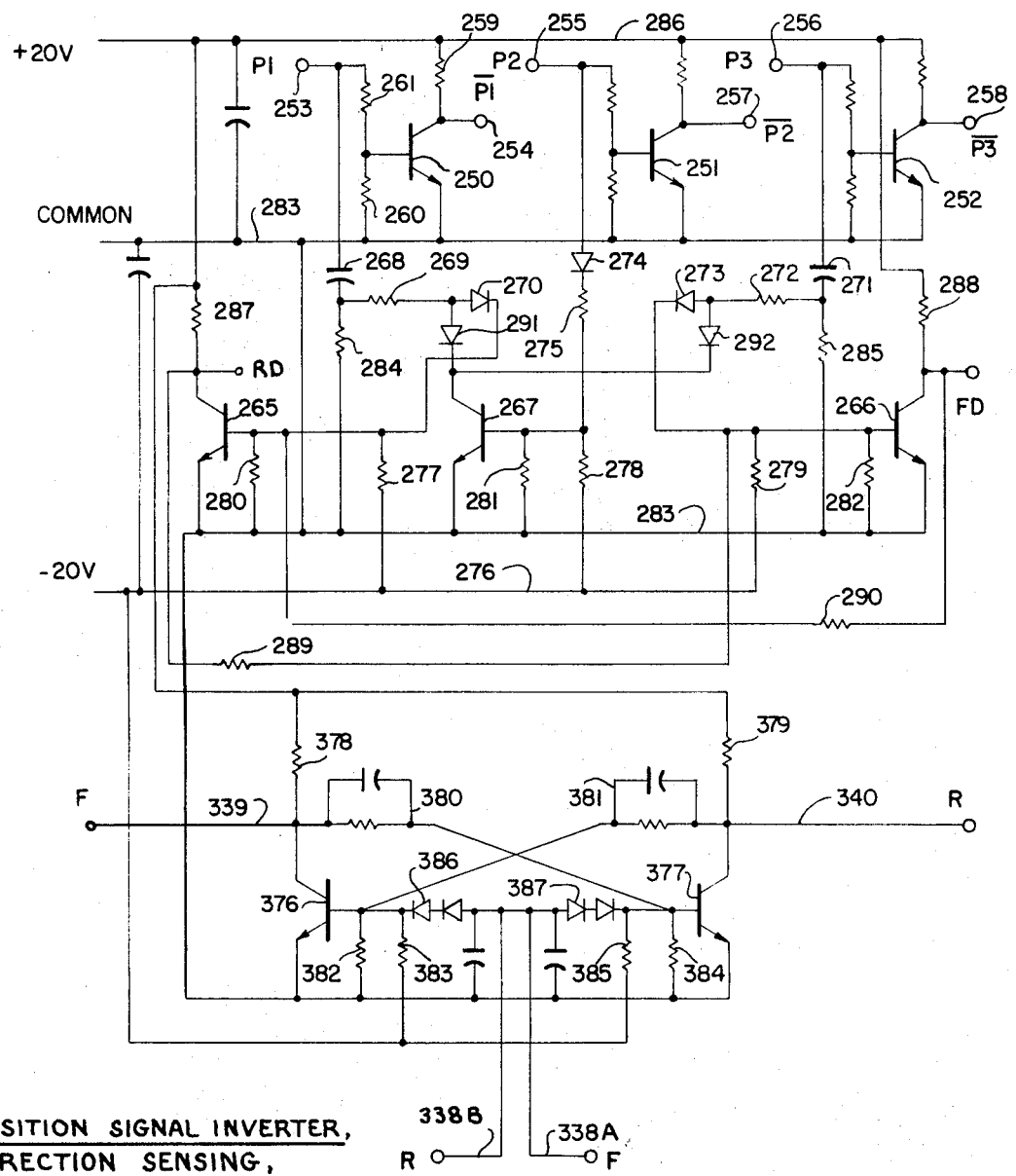
FIG. 18 illustrates schematically the position inverter, direction sensing and F/R flip-flop circuits of the present invention.

Referring to FIG. 18, there is illustrated the position inverter, direction sensing and flip-flop stages 52, 56 and 58, respectively, of FIG. 2. The position inverter 52 includes three inverting amplifiers including in the preferred embodiment shown in FIG. 18, transistors 250, 251 and 252, each of which receives a position signal. Signal P1 is applied at terminal 253 and the inverted output $\overline{P1}$ is taken at terminal 254. Likewise, signals P2 and P3 are applied at terminals 255, 256 and the inverted outputs $\overline{P2}$ and $\overline{P3}$ are taken at terminals 257, 258, respectively. Each stage is biased through its collector resistor 259 and base resistors 260 and 261.

The direction sensing stage 56 of FIG. 2 is detailed in FIG. 18 just below the position inverter, as viewed in the drawing, and includes a flip-flop circuit comprising transistors 265 and 266 and a clamping circuit comprising transistor 267. Inputs P1, P2 and P3 are coupled from input terminals 253, 255 and 256, respectively, of the position inverter to the flip-flop and clamping circuit. To this end, terminal 253 is connected to the base electrode of transistor 265 through capacitor 268, resistor 269 and diode 270. Terminal 256 is similarly connected to the base electrode of transistor 266 via capacitor 271, resistor 272 and diode 273, and terminal 255 is connected to the base of transistor 267 via diode 274 and resistor 275. Resistors 277, 278 and 279, provided between the base electrodes and the negative bus 276, and resistors 280, 281, 282 connected between the transistors' base electrodes and common bus 283 st the bias of the base. Resistors 284 and 285 connect the lower ends of differentiating capacitors 268 and 271 to the common line 283. The collectors of transistors 265 and 266 are returned to positive bus 286 via resistors 287 and 288, respectively. The collector electrode of transistor 265 is coupled to the base of transistor 266 via resistor 289. Resistor 290 couples the output from transistor 266 to the base electrode of transistor 265. Diodes 291 and 292 couple the collector electrode of transistor 267 to the input differentiating circuit connected to terminals 253 (P1) and 256 (P2), respectively.

In operation, transistor 267 clamps the trigger pulses coming into the flip-flop and is turned ON by a position signal P2 at terminal 255. When the P2 signal is OFF, there are positive going changes at either of terminals 254 or 258, depending on the direction of motor 10 rotation. If the motor is being driven in the forward or clockwise direction, for example, a positive going change is reflected by position sensor P1 providing a positive going P1 signal at terminal 253 while the transistor 267 is OFF.

This P1 signal is differentiated by the RC network 268, 269 and directed to the base of flip-flop transistor 265. Transistor 265 is turned ON placing terminal RD at essentially ground or common potential. Since the base electrode of transistor 266 is coupled to the collector, transistor 266 is turned OFF by the voltage across resistor 279 connected to the negative bus. An output is taken at the FD terminal indicating the motor is being driven in the forward direction.

If the motor is driven in a reverse direction, a positive going signal P3 is generated by position sensor 38, FIG. 2, while the transistor 267 is OFF. This signal appears at terminal 256 where it is differentiated and directed to the base of transistor 266. Transistor 266 is driven ON, returning FD to ground potential, transistor 265 is turned OFF and an output is taken at the RD terminals indicating reverse rotation of the motor. The RD and FD output signals are applied via line 85 (FIG. 2) to the coordination circuit 84 which is shown in detail in FIG. 17, and hereinafter described.

The coordination circuit is capable of controlling the motor in four quadrant operation. In addition to the FD and RD signals applied from the direction sensing circuit, a voltage feedback signal developed by rectifier 44, FIG. 2, and a current feedback signal from stage 42 are applied to control the coordination circuit 84 in response to the demand of the reference signal introduced at input 87.

Figure 16:
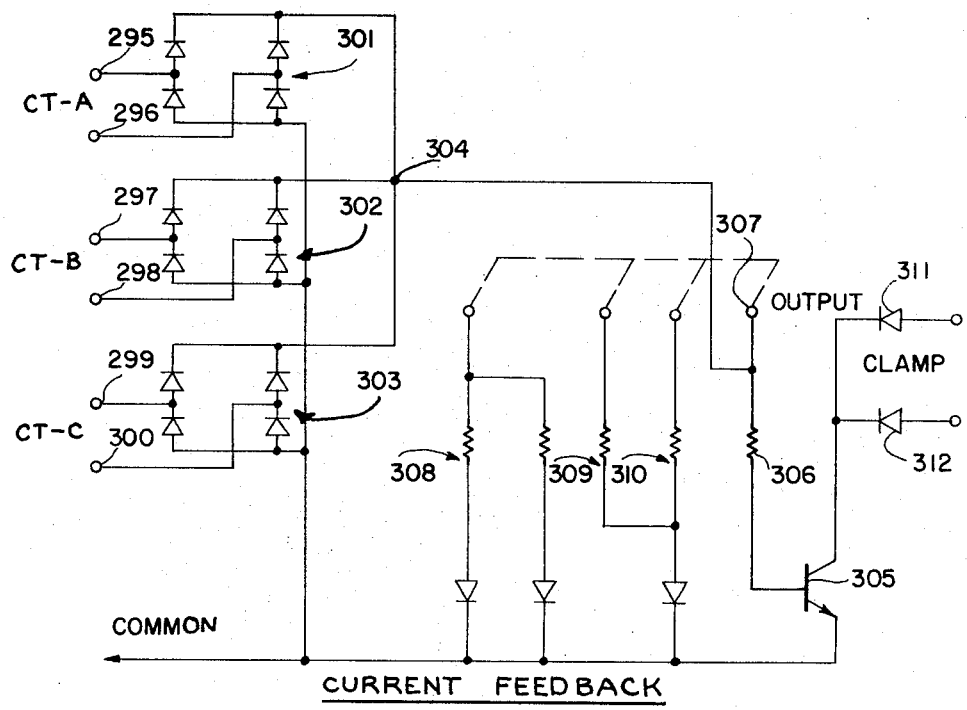
FIG. 16 is a schematic diagram of the current feedback circuit of the present invention.

The current feedback circuit provides a double function. In addition to providing a voltage proportional to current flow in the "A," "B," and "C" lines, it also provides a clamp for the F/R flip-flop 58 and coordination control. Referring to FIG. 16, terminals 295, 296, 297, 298, 299 and 300 are connected across the output windings of three current transformers (not shown) each of which is associated with one of the input lines "A," "B" or "C. " The output of each of the current transformers is rectified by diode networks 301, 302, 303 which have their outputs connected to a common junction point 304 so that the rectified outputs are summed. The resultant signal is directed to the base electrode of clamping transistor 305 through resistor 306. Terminal 307 provides a pick-off point for a current feedback and/or current limit signals. Impedance networks 308, 309 and 310 may be connected to terminal 307 as indicated by the dash lines to change the voltage and shunt away some of the current from the base of transistor 305 to permit higher current drives. Diodes 311 and 312 are operably connected to the collector electrode of transistor 305, which has its emitter electrode returned directly to the common line. Diodes are series-connected between the resistors 308, 309 and 310 and the common line. These diodes compensate for the base-emitter drop of the transistor 305 so that clamping occurs at low currents if the range clamping impedance networks are connected into the circuit.

Voltage rectifier 44, FIG. 2, is a conventional arrangement, but it should be noted that further processing of the voltage feedback is necessary to the operation of the circuit since no phase sequence detection is provided for detecting direction of rotation from the motor 10 terminal voltage.

Figure 17:
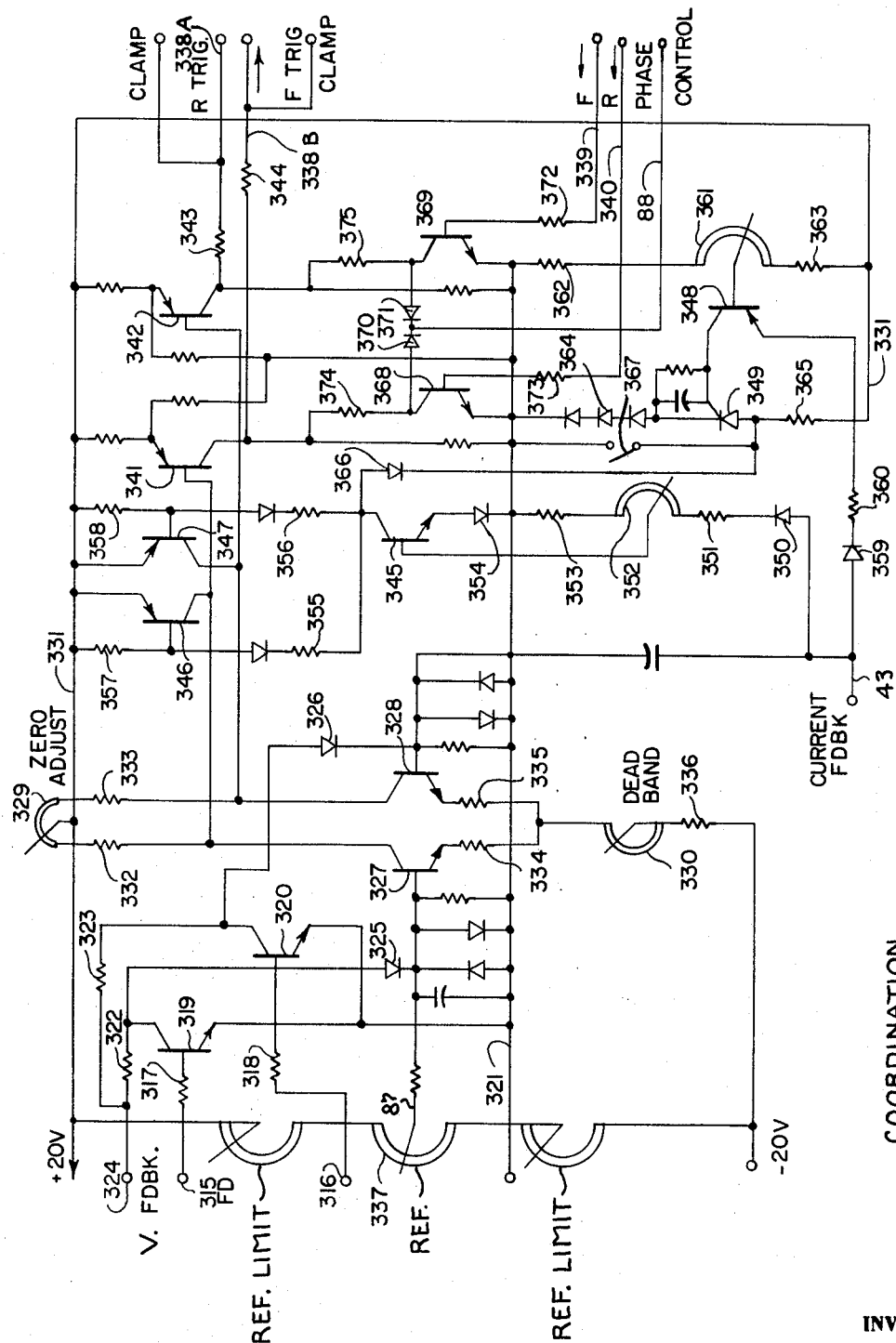
FIG. 17 is a schematic diagram of the coordination circuit of the present invention.

FIG. 17 illustrates schematically the coordination control circuit 84, FIG. 2, of the present invention. The FD and RD signals are applied at terminals 315 and 316, respectively, which are connected through resistors 317 and 318 to the base electrodes of transistors 319 and 320. The emitter electrodes of transistors 319 and 320 are returned directly to the common of ground bus 321, while the collector electrodes are separately connected through resistors 322 and 323 to the input terminal 324 which receives the voltage feedback signal from the rectifier 44 of FIG. 1. The outputs of transistors 319 and 320 in FIG. 17 are taken from the collector circuit and coupled via diodes 315 and 326, respectively, to the base electrodes of transistors 327 and 328.

Transistors 327 and 328 provide speed and direction control and include the usual zero and dead band adjust potentiometers 329 and 330 connected in the circuit between positive bus 331 and the negative (−20v) bus with resistors 332, 333, 334, 335 and 336. The base electrode of transistor 327 is returned to a voltage divider comprising reference control 337 which establishes a positive or negative reference signal.

When the reference is positive and the machine is rotating in the forward direction, transistor 319 is ON and transistor 320 is OFF. The positive reference tends to turn transistor 327 ON, but transistor 319 shunts the voltage feedback path to the base and prevents the positive feedback signal from helping to turn ON transistor 327. Instead, the voltage feedback is directed to the base of transistor 328 which makes it appear like negative feedback. With a negative reference and reverse rotation, transistor 319 is OFF and transistor 320 is ON.

The reference and the voltage feedback, which are of opposite polarities, are summed at the base of transistor 327.

The outputs of control transistors 327 and 328, together with a current feedback signal develop a control signal that is applied through line 88, FIG. 2, to the phase control timing stage 75 and R and F trigger signals that are applied through lines 338A and 338B, respectively, to F/R flip-flop stage 58. Output F and R signals from the flip-flop stage 58 are coupled back to the coordination stage on lines 339A and 339B, respectively, for proper phase control.

The outputs taken from control transistors 327 and 328 are coupled directly to the base electrodes of transistors 341 and 342, respectively, the collector electrodes of which are connected through resistors 343 and 344 to the R and F trigger lines, respectively. The collector voltages of transistors 341 and 342 are used to flip the F/R flip-flop stage 58, FIG. 2, but only when current feedback releases the clamp. Current feedback applied through line 43 reduces the phase control output on line 88 by means of the circuits comprising transistors 341, 342, 345, 346 and 347 when excessive current is drawn from the a-c input. Current feedback is also applied to the instantaneous overcurrent circuit comprising transistor 348 and silicon control rectifier (SCR) 349.

The current feedback path to the phase control drive may be traced through diode 350, resistor 351 and the lower portion of current limit adjusting potentiometer 352 to the base electrode of transistor 345. The upper portion of potentiometer 352 is returned through biasing resistor 353 to the common return line 321. The emitter electrode of transistor 345 is returned to the common line through diode 354, while the collector output is applied as a control signal to the base electrode of transistors 346 and 347 through resistor-diode combination 355 and 356, respectively. Resistors 357 and 358 establish proper biasing voltages for the associated base electrodes of transistors 346 and 347.

The presence of a current feedback signal at line 43 is used to turn ON transistor 345 and the resultant swing in collector voltage is applied to transistors 346 and 347 which are turned ON. The collector voltage of transistors 346 and 347, when ON turns transistors 341 and 342 OFF, reducing the phase control output on line 88.

The instantaneous overcurrent circuit functions in a similar manner, but SCR 349 is used to turn transistors 346 and 347 ON. To this end, the overcurrent feedback signal from terminal 43 is directed to the emitter electrode of transistor 348 through diode 359 and resistor 360. The base of transistor 348 is connected to the overcurrent limit potentiometer 361, which is part of a voltage divider formed with resistors 362 and 363. The collector voltage of transistor 348 is used to trigger SCR 349, the cathode of which is connected to the common line through a plurality of series connected diodes 364, while the anode is returned to positive bus 331 through resistor 365. The junction of the anode and resistor 365 is coupled to the collector electrode of transistor 345 through diode 366 so that the firing of SCR 349 returns the collector of transistor 345 to the common line turning ON transistors 346 and 347. A manual reset is provided by switch 367 which, when closed, connects the anode of SCR 349 to the common return line 321 turning SCR 349 OFF.

The output signal to the phase control timing stage is applied through line 88 and is taken at the collectors of transistors 368 and 369. The differential output on these collectors is combined by diodes 370 and 371 so that the higher potential of the two is applied to the phase control timing stage. Transistors 368 and 369 prevent a sudden change in reference from phasing back the drive which, in the absence of the transistors 368 and 369 would then be phased on again by the other half of the circuit. Transistors 368 and 369 are turned ON by the F and R signals applied from F/R flip-flop on lines 339 and 340. The F and R signals corresponding to forward and reverse motion of the motor 10 are applied to the base electrodes of transistors 368 and 369 through resistors 372 and 373.

The F/R flip-flop 58 of FIG. 2 is a conventional flip-flop arrangement having, as shown in FIG. 18, transistors 376 and 377 which are alternately triggered into their opposite conducting and non-conducting states. The collector electrodes are returned to the positive bus via resistors 378 and 379 and are cross coupled to the opposite base electrodes via RC networks 380 and 381. The emitter electrodes are returned to the common bus 283. Resistors 382–385 establish the operating level on the base electrodes and the F and R trigger pulses from lines 338A and 338B are applied to the base electrodes of transistors 376 and 377, respectively, via diodes 386 and 387.

From the above description, it is evident there is provided a novel adjustable speed control circuit for a brushless direct current motor drive. A reference voltage is compared to a voltage feedback signal from the motor and forward (F)/reverse (R) signals are developed as a function of the error. A current feedback signal inhibits operation changes until current is turned off to prevent combinations of SCRs that would short circuit the line from being turned on. The F/R signals together with position signals generated as a function of a shaft position converter enable SCR groups. These groups are fired by phase control signals which apply bursts of oscillator pulses to the SCR gates. In regenerative quadrants, commutation between motor legs is accomplished by motor CEMF and between SCRs connected to the same leg by a-c line potentials.

While a single embodiment of the invention has been described, it is not intended thereby to limit the invention to the exact illustrative embodiment, for various changes will suggest themselves to those having ordinary skill in the art. Accordingly, reference should be made to the following claims which define the full scope of the invention:

What I claim as new and desire to secure by Letters Patent of the United States is:

1. In an adjustable speed drive system including a plurality of controllable rectifiers for coupling a polyphase a-c electric power source and a polyphase motor including a rotor for rotation within and relative to stationary armature windings, rotor position sensing means coupled to the rotor for developing sequential position signals indicative of the angular position and direction of rotation of the rotor, phase-sensing means coupled to the a-c electric power source for generating sequential phase signals each indicating that a respective one of the phases has attained a predetermined polarity and magnitude, improved control means for controlling drive system operation throughout a full reversible range of motoring and regenerative operation, said improved control means comprising:

a command signal source for generating a reference signal having a polarity and magnitude indicative of a desired level of motor performance within a range of permissible performance, a performance signal source coupled to the motor and said command signal source for generating a performance signal having a polarity opposite to that of the reference signal and a magnitude indicative of the actual level of motor performance within the range of permissible performance, the absolute magnitude of the performance signal for any given level of actual performance being substantially equal to the absolute magnitude of the reference signal indicative of said given level of motor performance, first means coupled to the command signal source and the performance signal source and being responsive to a reference signal and a performance signal for generating a comparison signal having a magnitude proportional to the sum of the reference and performance signals, second means coupled to said first means, said command signal source, and said rotor position sensing means for receiving therefrom as input signals the comparison signal, the reference signal, and the position signals for generating in response thereto a first output signal when the input signals are consistent with drive system operation in either the forward motoring mode or the reverse regenerative mode and for generating in response thereto a second output signal when the input signals are consistent with drive system operation in either the forward regenerative mode or the reverse motoring mode, and firing signal generation means coupled to said second means and being responsive to first and second output signals therefrom to generate and supply firing signals to the controllable rectifiers in a first sequence in response to the first output signal and to generate and supply firing signals to the controllable rectifiers in a second sequence in response to the second output signal, said firing signal generation means also being coupled to said first means, said phase-sensing means, and said rotor position sensing means for receiving therefrom the comparison signal, the phase signals, and the position signals and being responsive thereto to control the rate of power transfer between the a-c power source and the motor.

2. An adjustable speed drive system as defined by claim 1 further including current sensing means coupled to the a-c power source for generating feedback signals representative in magnitude of the current flow through selected ones of the controllable rectifiers, the feedback signals being coupled to said second means to permit changes in firing signal sequence only when the current flow is at a level at which the change in sequence may be made without damaging changes in current flow.

3. An adjustable speed drive system as defined by claim 2 including, additionally, a reactor having a center-tapped winding per motor armature winding, the center tap of each of the windings being connected to a respective one of the motor armature windings, a first end tap of each center-tapped winding connected to a plurality of controllable rectifiers poled in a first direction and a second end tap of each center-tapped winding connected to a like plurality of controllable rectifiers poled in the opposite direction, the plurality of controllable rectifiers in each instance being equal to the number of phases comprising the a-c electric power source, each reactor winding thereby conducting electric power in a first direction with respect to the motor between the center tap and the first end tap, and in a second direction with respect to the motor between the center tap and the second end tap as governed by the firing of the oppositely poled controllable rectifiers associated therewith and introducing a current limiting impedance between the oppositely poled controllable rectifiers as added protection therefor in the event of a malfunction.

* * * * *